United States Patent [19]

Orian

[11] Patent Number: 4,597,745
[45] Date of Patent: Jul. 1, 1986

[54] ELASTIC PROTECTIVE BELLOWS FOR A HOMOKINETIC TRANSMISSION JOINT

[75] Inventor: Michel A. Orian, Conflans Sainte Honorine, France

[73] Assignee: Glaenzer Spicer, Poissy, France

[21] Appl. No.: 668,555

[22] Filed: Nov. 2, 1984

[30] Foreign Application Priority Data

Nov. 8, 1983 [FR] France .................. 83 17736

[51] Int. Cl.$^4$ .......................... F16D 3/84; F16J 15/00
[52] U.S. Cl. ............................... 464/173; 277/212 FB
[58] Field of Search ............ 464/7, 11, 133, 173–175; 277/212 R, 212 C, 212 F, 212 FB

[56] References Cited

U.S. PATENT DOCUMENTS

| | | | |
|---|---|---|---|
| 1,117,961 | 11/1914 | Phillips | 464/173 X |
| 3,210,107 | 10/1965 | Flumerfelt | 277/212 FB X |
| 3,476,417 | 11/1969 | Born et al. | 277/212 FB X |
| 3,511,061 | 5/1970 | Burckhardt | 277/212 FB X |
| 3,669,459 | 6/1972 | Bass | 277/212 F X |
| 3,688,523 | 9/1972 | Schafer | 277/212 FB X |
| 4,318,282 | 3/1982 | Orain | 464/115 X |

FOREIGN PATENT DOCUMENTS

| | | |
|---|---|---|
| 2736140 | 2/1979 | Fed. Rep. of Germany . |
| 2945234 | 5/1981 | Fed. Rep. of Germany . |
| 2171725 | 8/1973 | France . |
| 2433675 | 3/1980 | France . |
| 2499910 | 8/1982 | France . |
| 787767 | 12/1957 | United Kingdom ........ 464/173 |
| 1096987 | 12/1967 | United Kingdom ........ 464/175 |

*Primary Examiner*—Stuart S. Levy
*Assistant Examiner*—Thomas R. Hannon
*Attorney, Agent, or Firm*—Wenderoth, Lind & Ponack

[57] ABSTRACT

Elastic or flexible protective bellows of a homokinetic transmission joint for a motor vehicle wheel, connected in a sealed manner to a bowl element 2 of the joint, comprising, when mounted on the joint, an active part constituted by two coaxial spherical segments 3, 4, one of which is outside the other, interconnected by a curved trough 5 and defining with the latter a U shape. The active part 3, 4 can extend by a lengthening of the segments, on one side, and a shortening, on the opposite side, when the joint pivots through a given angle. This joint has, in particular, the advantage of completely eliminating wear by abrasion between the inner surfaces of the joint, the active segments 3, 4 being indeed always separated by lubricant. Further, the many folds of conventional bellows are eliminated, which considerably simplifies the manufacture of the bellows.

15 Claims, 12 Drawing Figures

ELASTIC PROTECTIVE BELLOWS FOR A HOMOKINETIC TRANSMISSION JOINT

The present invention relates to an elastic or flexible protective bellows for a homokinetic transmission joint for a motor vehicle wheel arranged to be connected in a sealed manner to a bowl element and to a joint shaft.

It is known that elastic bellows are mainly used for protecting articulated mechanisms from exterior agents and for retaining the lubricant inside these mechanisms.

Homokinetic joints for automobiles are essentially equipped with such bellows which constitute the weak point of these joints, since, when the bellows is damaged, the lubricant escapes and the mechanism of the joint is rapidly destroyed by seizure.

Now, known bellows are very vulnerable for the following reasons:
  the area of their wall exposed to impacts and various attacks by exterior agents is large owing to their large axial development;
  the contour of these bellows is complicated: indeed, it comprises folds which are arranged in succession axially of the bellows so that a precise production tooling is required, and the moulding operation is rendered delicate if it is desired to obtain a wall which is homogeneous and of good mechanical quality at every point;
  when the homokinetic joints of the steering wheels turn at an angle, the folds come in contact with each other and are rapidly worn by abrasion or, at a large angle (45°), they become wedged in the mechanical parts in the compressed zones or become locally unstable and rupture in the extended zones. The folds are thus rapidly damaged by contact with the neighbouring angular inner and outer component parts;
  the known bellows also have a tendency to be dynamically unstable at high speed, which prevents the use of very flexible elastomers which would however have an improved performance as concerns fatigue;
  their large axial development does not allow short connections between the shaft and the joint.

An articulated coupling is known from the Swiss Pat. No. 333 637 which comprises two rotating parts interconnected by a flexible sleeve constituting a bellows. But experience has shown that this sleeve, which is obtained from two spherical parts, can also fold or roll up along a single priviledged folding angle contrary to the indications in this document. Indeed, it becomes blocked if it is desired to continue the pivoting of the inner part in the outer part.

An object of the invention is to provide a protective bellows which considerably reduces or completely eliminates the aforementioned drawbacks of known bellows.

The invention provides a bellows which comprises, when it is mounted on the joint, an active part constituted by two substantially spherical coaxial segments, one of which is outside the other, interconnected by a curved movable trough so as to have with the trough a subtantially U shape, the active part being capable of extending by a lengthening of the segments on one side and a shortening thereof on the opposite side when the joint turns at a given angle, and the two spherical segments being obtained by moulding in a single spherical segment comprising two parts located in the extension of each other, one part being turned back toward the interior of the bellows when assembling the bellows and the joint so as to form the two spherical segments interconnected by the U-section trough resulting from this turning back so that the plane tangent to the vault of the trough is maintained in the vicinity of the centre of rotation of the joint when the joint parts are put at an angle.

As the volume between the outer and inner active segments is filled with a lubricant in the same way as the whole of the volume inside the bellows, it will be understood that any abrasion between the inner surfaces of said segments is prevented when the joint parts operate at an angle so that there is practically avoided any wear of the bellows for this reason.

Further, the bellows no longer has a succession of folds so that another cause of abrasion is eliminated when the joint parts operate at a large angle.

According to a feature of the invention, the inner spherical segment is connected by a bend to a connecting part secured to the bowl element in the known manner.

Thus, the bellows has in all only two bends or folds, which imparts thereto a simple structure and facilitates its manufacture by simplifying the moulding operation and the required tooling.

In an embodiment of the bellows adapted to equip a sliding homokinetic joint, according to the invention it is arranged that its thickness increases from the outer active segment toward the shaft of the joint by constituting a dead wall whose end is separated from the shaft by an annular opening and which is extended axially by a fold provided with an end flange fixed in the known manner to the shaft so as to connect the bellows to the latter, the bellows being filled with lubricant which can flow from the inner cavity to the fold in the space inside the dead wall and vice-versa during the axial movements of the shaft.

In another embodiment of the invention, the bellows comprises an active part formed by a spherical segment whose thickness increases from the bowl to the shaft and whose end adjacent to the shaft is provided with a flange fixed to the latter in a sealed manner while its end contiguous with the bowl element is extended by a bend connected to an annular end part fixed to the bowl element in a sealed manner, this bellows having its centre of rotation located between the flange fixed to the shaft and its centre of curvature.

In the various embodiments of the invention, the structure of the bellows is considerably simplified relative to that of known bellows and the causes of abrasion are practically eliminated. Further, their small axial development allows short connections between the shaft and the joint.

Further features and advantages of the invention will be apparent from the following description with reference to the accompanying drawings which illustrate several embodiments by way of non-limiting examples:

Figure 1:
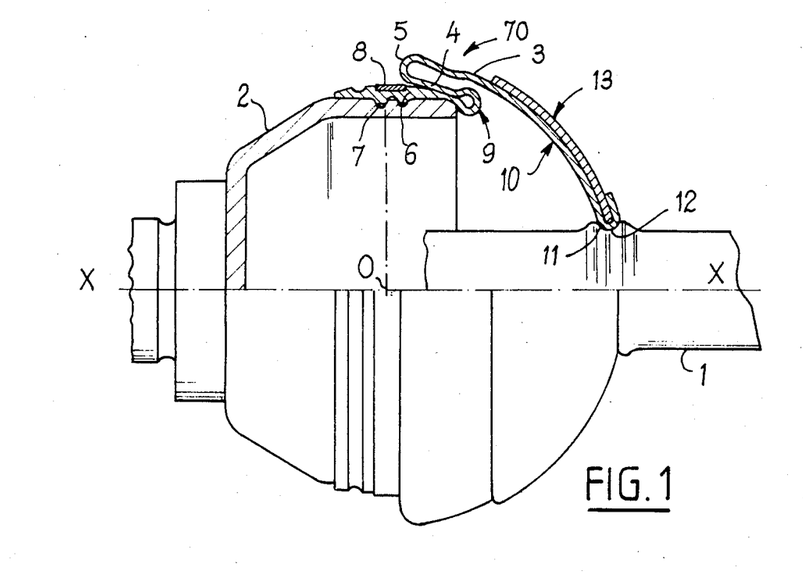
FIG. 1 is an axial half-sectional and half-elevational view of a homokinetic transmission joint for a motor vehicle wheel equipped with a bellows according to a first embodiment of the invention.
Figure 2:
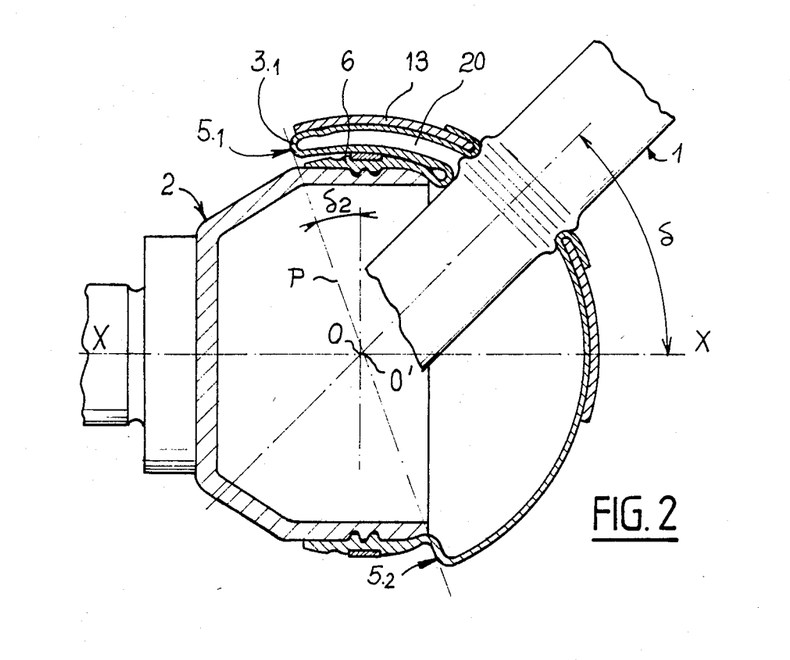
FIG. 2 is a view similar to FIG. 1 of the configuration of the bellows when the joint parts are operating at a large angle.

With reference to FIGS. 1 and 2, there is partly shown a homokinetic driving joint of an automobile steering wheel (not shown), comprising a shaft 1 and a bowl element 2, the joint parts being in the aligned position thereof. This joint is equipped with an elastic or flexible protective bellows 70 which is moulded in a single piece and which, when mounted on the joint, has an active part constituted by two substantially spherical segments 3, 4 coaxial with the shaft 1, namely an outer segment 3 and an inner segment 4 which are interconnected by a trough 5 which is curved in the shape of a semi-circumference so as to have with the segments a substantially U shape.

The inner spherical segment 4 is connected by a bend 9 to a connecting part 6 which is fixed to the bowl element 2 in the known sealed manner by means of inner heel portions 7 which are embedded in corresponding grooves in the bowl element 2, and an outer collar 8 embedded in the end part 6 so that the latter is gripped around the periphery of the bowl element 2.

The outer active segment 3 is extended by a spherical segment 10 which closes the bellows 70 by connecting it to the shaft 1. The sealing and the fixing of the bellows 70 are achieved in this embodiment by the fitting of the end fold 11 of the bellows in a conjugate groove 12 in the shaft 1 and by a spherical dome 13 of metal or a suitable plastics material which is applied against the segment 10 in such manner as to cause the fold 11 to be gripped in the groove 12. The dome 13 therefore maintains the bellows 70 on the shaft 1 and at the same time protects the bellows.

The two spherical segments 3, 4 and the other parts (5, 6, 10) of the bellows 70 are moulded in a single sphere, which constitutes an important feature of the invention.

Figure 3:
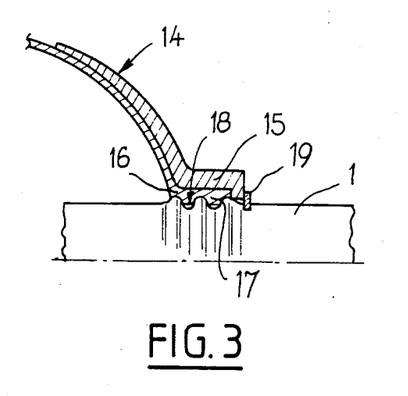
FIG. 3 is an partial axial half-sectional and half-elevational view of a second embodiment of the bellows according to the invention.

In the modification shown in FIG. 3, the spherical dome 14 has a flange 15 which is fitted on an annular neck 16 of the bellows so as to trap two trapezoidal heel portions 17 which project internally of the neck 16 into conjugate grooves 18 in the shaft 1. A circlip 19 engaged around the shaft 1 axially retains the dome 14.

Figure 4:
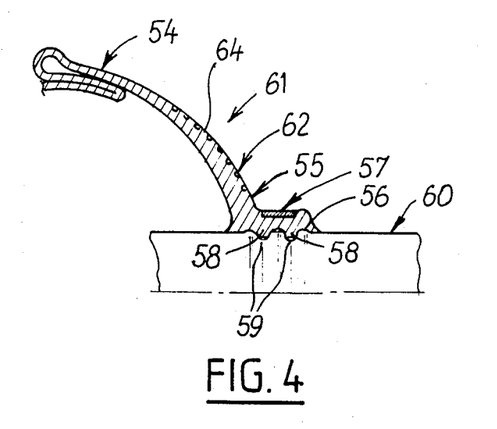
FIG. 4 is a partial view similar to FIG. 3 of a third embodiment of the bellows according to the invention.

The protective dome 13, 14 may also be eliminated. In this case (FIG. 4), the thickness of the bellows increases progressively from its outer active segment 54 to the neck 55 which is extended by an end flange 56 for sealing and fixing to the shaft 60, this increase in thickness enabling the thinner active segment 54 to be suitably stabilized. The flange 56 is provided with two trapezoidal heel portions 58 and is maintained on the shaft 60 by a clamping collar 57. The bellows thus comprises a static zone 64 whose thickness increases in the direction of the shaft 60 which may possibly include striations 62 or pavements capable of stopping the propagation of commencements of cuts due to projections of stones such as silex.

When the joint parts are at an angle δ (FIG. 2), the shaft 1 has turned around the centre O located on the axis X—X, and the outer active spherical segment 3 has turned around its natural centre O' approximately located at the point O. Further, during the creation of the angle between the joint parts, the plane P tangent to the vault 5.1 of the trough, which passes through the lateral centre O' of rotation of the outer segment 3, is maintained in the vicinity of the centre of rotation O of the joint. The moving trough 5 correspondingly moves to the position indicated by the reference character 5.1 in the upper part of FIG. 2, the active part 3.1 and 4.1 thus having their length considerably increased while the trough reaches the position 5.2 in its lower part where, on the other hand, the active segments have practically disappeared, the vault of the trough 5 having turned through an angle equal to δ/2.

It can be seen that the inner segment 4.1 has grown to the extent of an arc δ/2 about the connecting part 6 while the lower part of the outer segment 3.1 has shortened to the extent of an angle δ/2 so that its active part has practically disappeared. Correspondingly, the protective dome 13 completely overlaps the outer active segment 3.1.

The volume 20 between the active segments 3 and 4 of the bellows 70 is filled with a lubricant (in the same way as the remainder of the volume of the bellows), which completely avoids abrasion between the inner surfaces 3, 4 when the joint parts operate at an angle, which constitutes an important advantage of the bellows according to the invention.

The invention also has the following advantages:

the area of the wall of the bellows 70 exposed to impacts and various attacks from exterior agents is considerably reduced owing to its small axial development and to the presence of the protective dome 13, 14;

the contour of the bellows 70 is very simplified relative to that of prior bellows, which facilitates its manufacture and permits the obtainment of a wall which is homogeneous and of good quality at every point;

the bellows no longer has folds which are capable of coming into contact with each other and consequently becoming worn or becoming wedged between the mechanical parts in the compressed zones; the causes of damage to the bellows are thus practically completely eliminated;

it is possible to manufacture the bellows according to the invention from flexible elastomers which have an improved performance as concerns fatigue.

The small axial development of the bellows permits a short connection between the shaft and the transmission joint.

Figure 5:
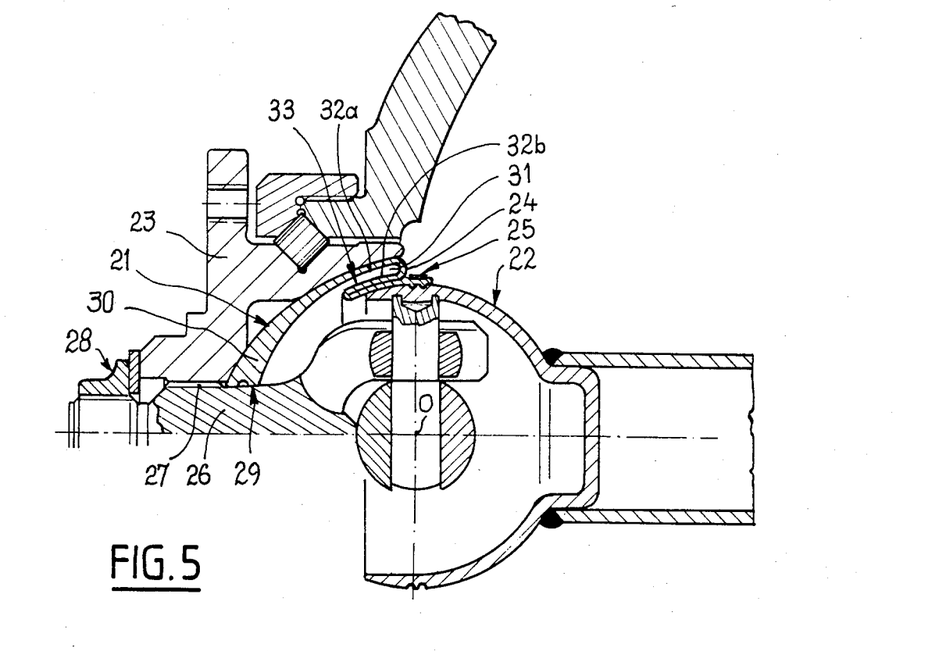
FIG. 5 is an axial sectional view of a homokinetic joint and of the associated wheel hub, equipped with a protective bellows according to a fourth embodiment of the bellows according to the invention.
Figure 6:
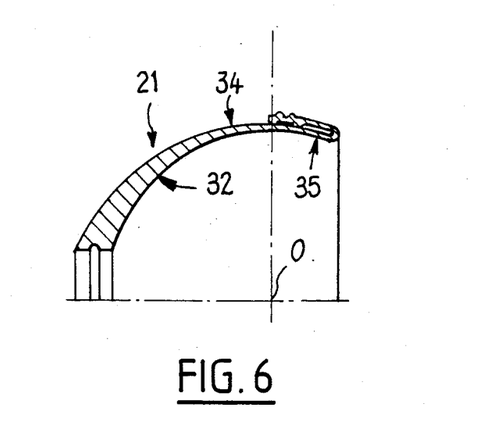
FIG. 6 is a partial elevational view of the bellows of FIG. 5 before it is mounted on the corresponding joint.

In the embodiment shown in FIGS. 5 and 6, the bellows 21 is mounted between the bowl element 22 of the homokinetic joint and the wheel hub 23 and has only a small visible annular surface constituted by a circular trough 24. The bellows 21 comprises, as in the preceding embodiments, two active segments 32a, 32b interconnected by the trough 24. The thickness of the bellows increases from the outer segment 32a to the shaft 26 of the joint around which there is thus formed a static part comprising a heel portion 30 which grips round the shaft 26 in a sealed manner. The bellows 21 may be fixed to the bowl element 22 by means of heel portions and a collar 25, in the way similar to the embodiment of FIGS. 1 and 2. The shaft 26 is fixed to the hub 23 by conical splines 27 and a nut 28.

The increase in the thickness of the bellows from the outer segment 32a to the heel portion 30 ensures the maintenance of the static part between the shaft 26 and the segment 32a. Further, the interior of the bellows 21, and in particular the space 31 between the segments 32a, 32b, is filled with lubricant which ensures an abriasion-free sliding between the inner surfaces of the segments 32a, 32b.

FIG. 6 shows the bellows 21 after moulding and before assembly on the homokinetic joint. The active segments 32a, 32b are in the extension of each other (34 and 35) before mounting between the homokinetic joint and the hub 23, and substantially centered at O, the vault of the trough 24 being eliminated.

The two spherical segments 34, 35 which are in the extension of each other are obtained by moulding in a single spherical segment, a portion of which is turned back toward the interior of the bellows 21 when assembling the bellows 21 and the joint, so as to form the two spherical segments 32a, 32b interconnected by the U-section trough 24 resulting from this turning back.

It will be understood that this manner of manufacturing and assembling the bellows also applies to the other embodiments of the bellows according to the invention, and in particular that shown in FIGS. 1 and 2.

Figure 7:
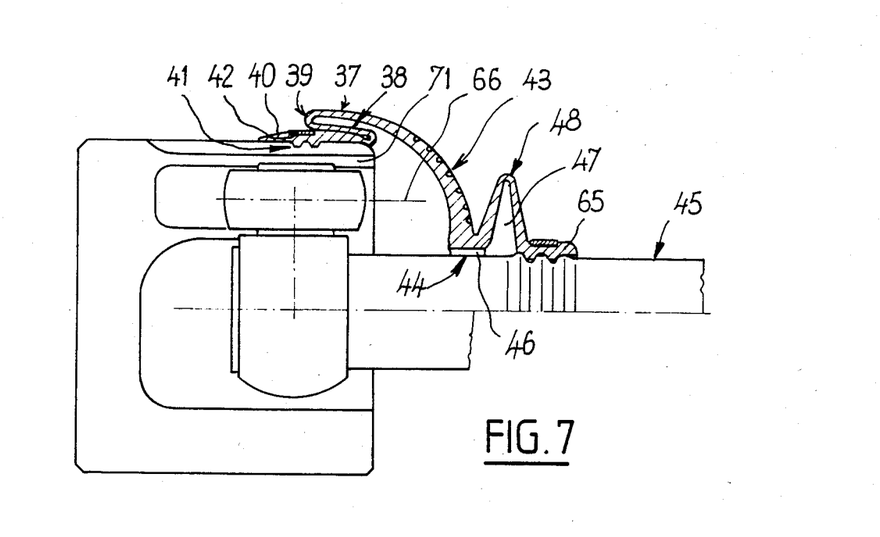
FIG. 7 is a longitudinal elevational view of a sliding homokinetic joint provided with a bellows according to a fifth embodiment.

The embodiment of the bellows shown in FIG. 7 is adapted for a sliding homokinetic joint. It comprises, as before, active sectors or segments 37, 38 and a trough 39 interconnecting these segments, the inner segment 38 being extended by a skirt 40 provided with sealing heel portions 41 and a collar 42 for fixing it to the bowl element 71 of the joint. The thickness of the bellows increases from the outer segment 37 to the shaft 45 of the joint and constitutes a dead wall 43 whose end is separated from the shaft 45 by an annular opening 44 and which is extended axially by a fold 48 provided with an end flange 65 which is fixed in the known manner to the shaft 45 so as to connect the bellows to this shaft.

The bellows is filled with a lubricant which can flow from the inner cavity 47 inside the fold 48 into the space 66 inside the dead wall 43 and vice-versa, during the axial displacements of the shaft 45. The presence of the fold 48 and opening 44 for the passage of the lubricant afford an axial freedom to the bellows without creating an over-pressure or a suction inside the bellows (see French Pat. No. 1 482 069).

Figure 8:
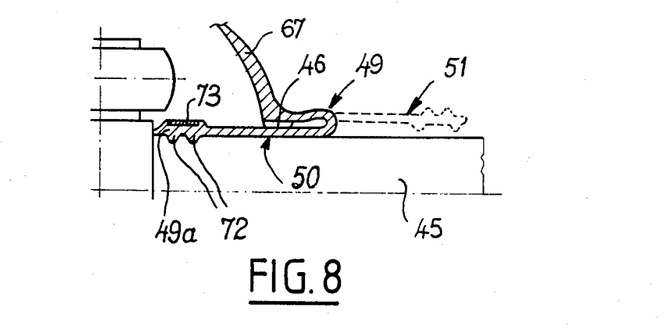
FIGS. 8 and 9 are partial axial elevational views of two modifications of the embodiment shown in FIG. 7.

In the modification shown in FIG. 8, the dead wall 67 having a thickness which increases in the direction of the shaft 45, is extended by a bent sleeve 49 which is turned back toward the interior of the joint and which has its end 49a fixed to the shaft 45 in the known manner, for example by heel portions 72 and a collar 73. The sleeve 49 is moulded in a rectilinear developed position 51 shown in dot-dash lines.

This sleeve may also be located outside the main volume of the bellows by assuming the position 68 (FIG. 9) in which its end 68a is fixed to the shaft 45 in the same way as in the modification shown in FIG. 7, the space inside the turned back sleeve 68 communicating with the main volume of the bellows through an annular opening 46 coaxial with the shaft 45, as in the case of the embodiment shown in FIG. 7, so as to provide a free passage for the lubricant.

Figure 9:
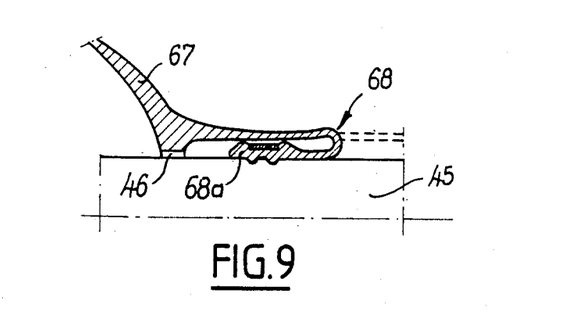

In the two modifications shown in FIGS. 8 and 9, the relative sliding between the walls of the bellows is always abundantly lubricated by the lubricant of the joint so that no wear is possible, while moreover the seal is absolutely guaranteed.

Figure 10:
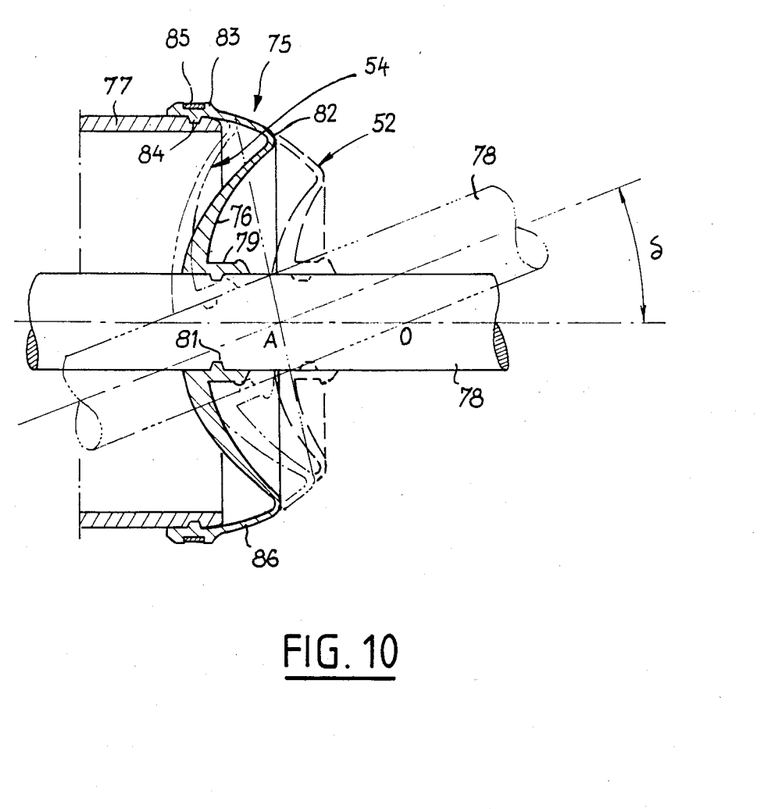
FIG. 10 is a partial axial elevational view of a homokinetic joint provided with a bellows according to a sixth embodiment of the invention.

In the embodiment shown in FIG. 10, the bellows 75 comprises an active part 76 formed by a spherical segment whose thickness increases from the bowl element 77 to the shaft 78 of the homokinetic joint, and whose end adjacent to the shaft 78 is provided with a flange 79 fixed to the latter in a sealed manner, this flange 79 being provided with annular heel portion 81 embedded in a corresponding groove in the shaft 78.

The end of the spherical segment 76 adjacent to the bowl element 77 is extended by a bend 82 connected to an annular end part 83 provided with a heel portion 84 embedded in a complementary groove in the bowl element 77, and fixed to the latter by a collar 85. The bellows 75 has a centre of rotation A located between the flange 79 and its centre of curvature O. The bellows 75 is moulded in a spherical shape 52 shown in dot-dash lines and is deformed upon assembly and assumes the position indicated by the reference character 76 in which the joint parts are in alignment. At an angle δ of the shaft 78, the bellows assumes the position shown by the reference character 54.

This embodiment of the bellows has the same advantages as the foregoing embodiments owing to the elimination of the multiplicity of the folds of prior bellows which eliminates abrasion between the surfaces of the bellows and considerably simplifies its structure and its manufacture.

Figure 11:
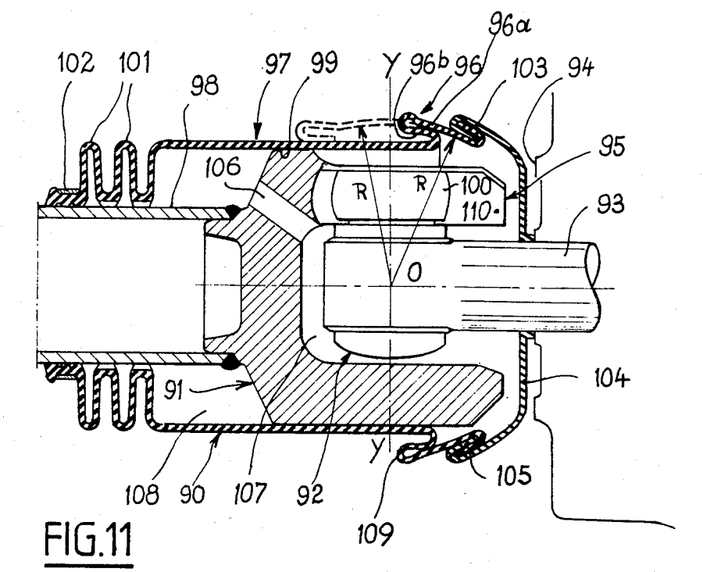
FIG. 11 is an axial half-sectional, half-elevational view of a joint equipped with a bellows according to a seventh embodiment, the joint parts being in alignment.
Figure 12:
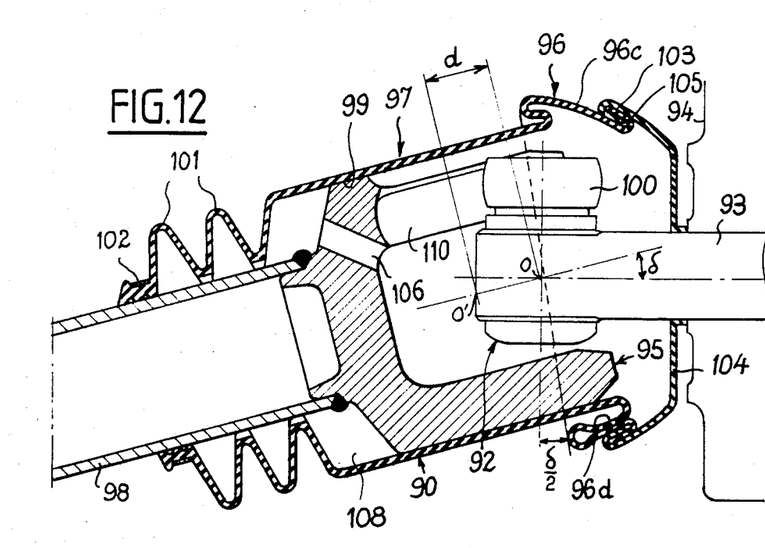
FIG. 12 is a view similar to FIG. 11 of the joint with its parts at an angle to each other.

The embodiment of the invention shown in FIGS. 11 and 12 shows a bellows 90 equipping a particular sliding tripod joint 91 comprising an inverted tripod element 92 fixed to the output shaft 93 of a differential and in the immediate vicinity of the crank-case 94 of the engine. The tripod element 92 is provided with rollers 100 which roll along tracks of petal portions of a tulip element 95.

The inversion of the tripod element 92 is advantageous in respect of the filtering of the vibrations (see French Pat. No. 2 429 928) but usually has the major drawback of requiring a minimum distance between the end of the tulip element 95 and the contiguous surface of the crank-case 94, of about 50 mm. This permits the positioning of a protective bellows of known type which is sufficiently flexible to accept rotation at an angle and the movements of compression and extension of the joint. Further, these bellows of known type have a large active surface exposed to radiation from the engine unit.

In this embodiment, it is arranged in accordance with the invention that the active part 96 of the bellows 90 constituted by two spherical segments 96a, 96b, is extended by a cylindrical skirt 97 surrounding the tulip element 95 in a sealed manner and fixed to a tublar shaft 98 connected to the tulip element 95. The cylindrical skirt 97 is freely slidably mounted on the outer surface 99 of the tulip element 85 and has a thickness preferably greater than that of the active zone 96. It is extended by folds 101 surrounding the tubular shaft 98 and is fixed to the latter by a collar 102.

Additionally, the periphery 103 of the active part 96 opposed to the spherical zone 97 is fixed to a cup 104 by a forming-over or setting of the pinching part 105 of the latter on the peripheral portion of the acting part 96. The metal cup 104 is a drive fit on the shaft 93 and is coaxial with the latter.

The active part 96 has a radius R and a swivel centre O which substantially coincides with the centre of the tripod element 92 located on the axis Y—Y' of this tripod element. The folds 101 extending the skirt 97 allow the extension of the joint, apertures 106 provided in the body of the tulip element 95 putting the inner volume 107 in communication, as concerns air and lubricant, with the annular space 108 between the skirt 97, the cylindrical surface 99, the body of the tulip element 95 and the folds 101 in the course of the extension-compression movements of the joint.

FIG. 11 shows in dashed lines the configuration of the active zone 96 when the latter is unfolded at the end of an extension of the joint.

After the joint parts have been put at an angle δ (FIG. 12), and the tubular shaft 98 has extended to the extent d, the bellows 90 has, on one side, a sole spherical segment 96c and, on the opposite side, an inner spherical segment 96d which is more extended than when the joint parts are in alignment, as illustrated in FIG. 11. The top of the vault 109 connecting the active part 96 to the skirt 97 has turned through an angle equal to δ/2 and has not been displaced relative to the centre O of the tripod element 92. This signifies that the natural centre of the active spherical wall 96 has remained centered on O. Further, the diameter of the annular space 108 has decreased by a length d, this decrease being absorbed by the opening of the folds 101 following on the putting of the joint parts at an angle.

What is claimed is:

1. An elastic or flexible protective bellows of a homokinetic transmission joint, said joint having a bowl element and a shaft for a motor vehicle wheel, said bellows being adapted to be connected in a sealed manner to said bowl element and to said shaft and comprising, when mounted on the joint, an active part constituted by two coaxial substantially spherical segments, one of which segments is outside the other, the segments being interconnected by a curved movable trough having a vault so as to present a substantially U-shape with said trough, the active part being capable of extending by lengthening of the segments on one side and shortening of the segments on an opposite side, when said bowl element and said shaft turn at a given angle about a centre of rotation, said two spherical segments being the result of a moulding in a single spherical segment comprising two parts in the extension of each other, one of said parts being turned back toward the interior of the bellows when assembling the bellows and the joint so as to form the two spherical segments interconnected by the U-shaped trough resulting from said turning back, so that a plane tangent to the vault of the trough is maintained substantially at said centre of rotation when said bowl element and said shaft are put at an angle to each other.

2. A bellows according to claim 1, wherein the inner spherical segment is connected by a bend in the bellows to a connecting part fixed to the bowl element.

3. A bellows according to claim 1, comprising a spherical dome for gripping and fixing the bellows to said shaft of the joint.

4. A bellows according to claim 3, wherein said bellows has an annular neck and said dome comprises a flange which clamps said annular neck to said shaft.

5. A bellows according to claim 4, wherein said annular neck comprises at least one annular heel portion and said shaft comprises at least one annular groove which receives said annular heel portion which latter is trapped in said groove.

6. A bellows according to claim 1, wherein the bellows has a thickness which increases progressively from said outer active segment to a neck of the bellows, which neck is extended by an end flange for sealing and fixing the bellows to said shaft, said end flange being maintained on said shaft by a collar so as to have a static zone.

7. A bellows according to claim 6, comprising means for stopping the propagation of commencements of cuts due to projections of stones.

8. A bellows according to claim 1, wherein the bellows has a thickness which progressively increases from the outer active segment to an end part which surrounds said shaft of the joint in a sealed manner.

9. A bellows according to claim 8, combined with a wheel hub and disposed between the bowl element of the joint and the hub.

10. A bellows according to claim 1, for equipping a slidable homokinetic joint, said bellows having a thickness which increases from the outer active segment to an end of the bellows adjacent to said shaft and constituting a dead wall having an end adapted to define with said shaft an annular opening and extended by a fold provided with an end flange for fixing in the known manner to said shaft so as to connect the bellows to said shaft, the bellows being filled with lubricant which is capable of flowing from a cavity inside the fold to a space inside said dead wall and vice-versa during axial displacements of the shaft.

11. A bellows according to claim 1, for equipping a slidable homokinetic joint, the bellows having a thickness which increases from the outer active segment to an end of the bellows adjacent to said shaft and constituting a dead wall adapted to define with said shaft an annular space for the passage of lubricant, said dead wall being extended by a bent sleeve which is turned back toward the interior of the bellows and has an end which is for fixing to the shaft and is capable of assuming a position which may be outside the bellows or inside the bellows relative to said annular opening.

12. A bellows according to claim 1, wherein the outer spherical segment is for directly connecting to an annular end part fixed to said bowl element in a sealed manner, and the inner spherical segment connected to the outer segment has a thickness which increases in a direction towards said shaft to which shaft it is fixed in a sealed manner, said bellows having a centre of rotation located between a flange of the bellows for fixing to said shaft and the centre of curvature of the bellows.

13. A bellows according to claim 1, for equipping an inverted slidable tripod joint fixed to an output shaft of a differential in the immediate vicinity of an engine crank-case, wherein the active part of the bellows is extended by a cylindrical skirt for surrounding a tulip element of the joint in a sealed manner and for fixing to a tubular shaft connected to the tulip element, the active part having a periphery opposed to the spherical skirt, which periphery is for fixing to a cup which is fitted on said output shaft of the differential in coaxial relation to said output shaft.

14. A bellows according to claim 13, wherein the cup is formed over onto the periphery of the active part of the bellows and the cylindrical skirt is extended by folds which are for fixing to the tubular shaft, the skirt being adapted to be freely slidable on the outer surface of the tulip.

15. A bellows according to claim 14, wherein the cylindrical skirt is thicker than said active part.

* * * * *

UNITED STATES PATENT AND TRADEMARK OFFICE
CERTIFICATE OF CORRECTION

PATENT NO. : 4,597,745

DATED : July 1, 1986

INVENTOR(S) : Michel A. ORAIN

It is certified that error appears in the above-identified patent and that said Letters Patent is hereby corrected as shown below:

On the cover page, in the heading, the inventor's last name
   should be changed from "Orian" to --Orain--;
In section "[75]" the inventor's last name should be changed
   from "Orian" to --Orain--.

Signed and Sealed this

Third Day of February, 1987

Attest:

DONALD J. QUIGG

Attesting Officer

Commissioner of Patents and Trademarks